United States Patent

[11] 3,604,923

| [72] | Inventor | Dillon W. Moffatt<br>727 Winnetka Ave., Golden Valley, Minn. 55427 |
|---|---|---|
| [21] | Appl. No. | 782,106 |
| [22] | Filed | Dec. 9, 1968 |
| [45] | Patented | Sept. 14, 1971 |

[54] SWIVEL MOUNTING FOR ELECTRICAL APPLIANCE
13 Claims, 12 Drawing Figs.

| [52] | U.S. Cl. | 240/52 R, 248/324, 285/282, 287/14 |
|---|---|---|
| [51] | Int. Cl. | F21v 21/00, F16l 27/00 |
| [50] | Field of Search | 240/52; 287/14; 285/282, 8; 248/324 |

[56] References Cited
UNITED STATES PATENTS

| 1,678,422 | 7/1928 | Dugdill | 285/DIG. 8 |
| 2,262,585 | 11/1941 | Irmischer | 285/282 X |
| 2,684,259 | 7/1954 | Schwartz | 285/DIG. 8 |
| 2,694,585 | 11/1954 | Fiori | 287/14 |
| 3,022,096 | 2/1962 | Schwartz | 285/DIG. 8 |

Primary Examiner—Samuel S. Matthews
Assistant Examiner—Robert P. Grenier
Attorney—Burd, Braddock & Bartz ABSTRACT: A lamp connected to a support with a flexible arm enclosing an electrical cable. Separate swivel mounts connected to opposite ends of the arm movably attach the arm to the support and to a lampshade. Each swivel mount has a stationary member with a fixed stop and a pair of relatively rotatable members mounted on the stationary member to permit approximately 600° of rotation of the flexible arm relative to the support and approximately 600° of rotation of the lampshade relative to the arm.

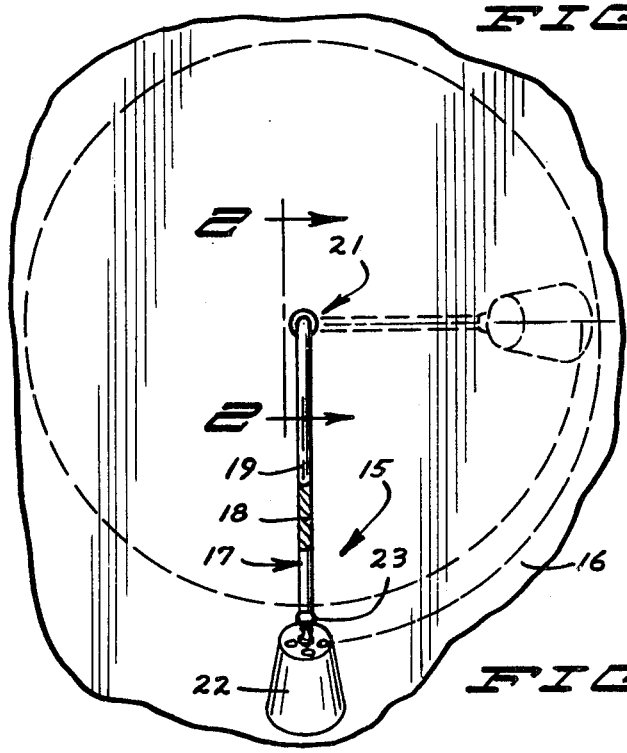

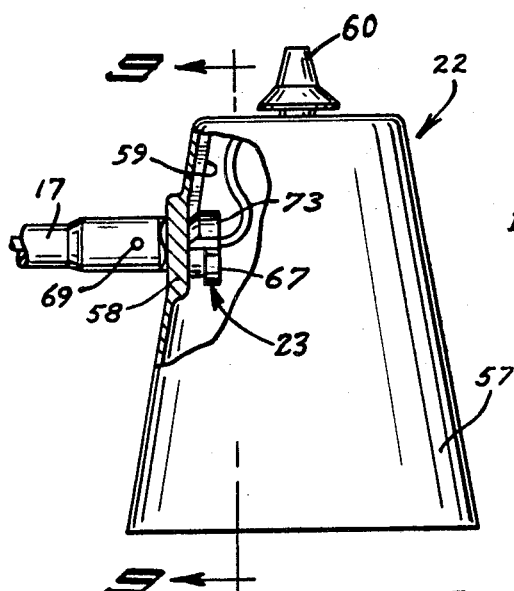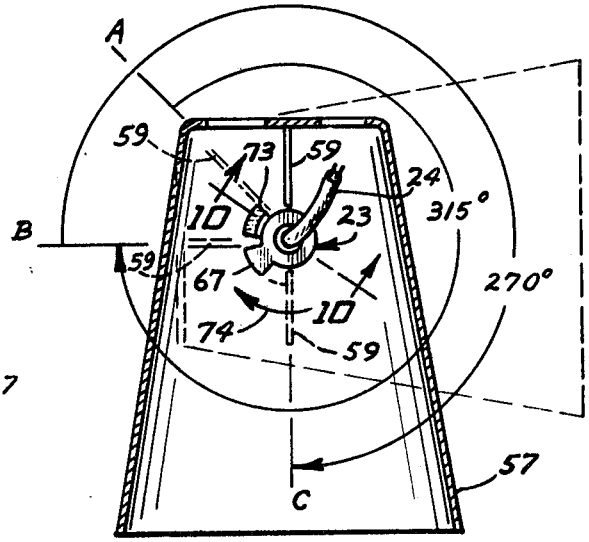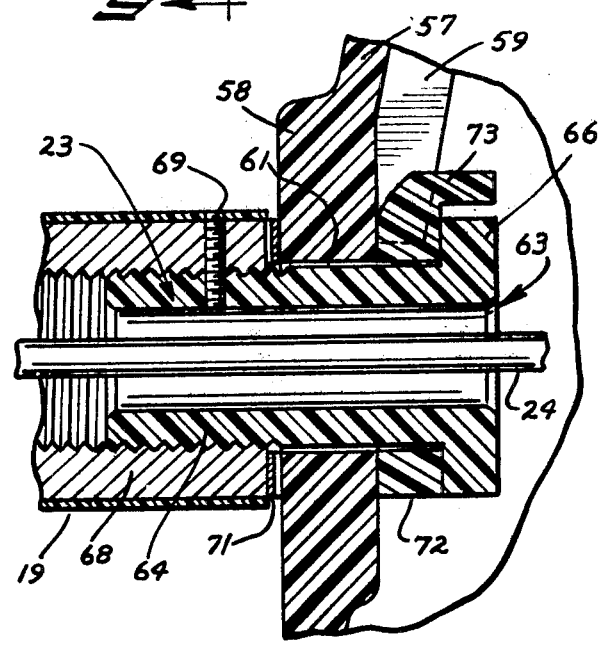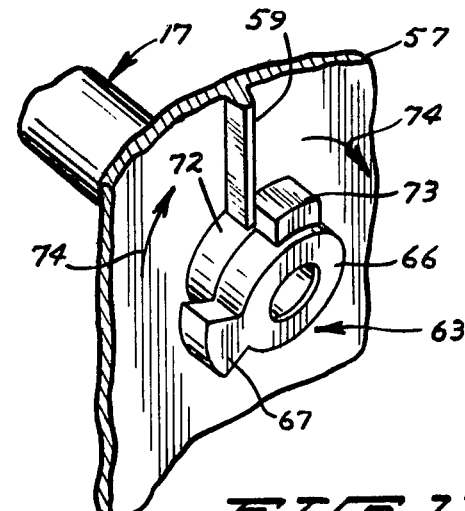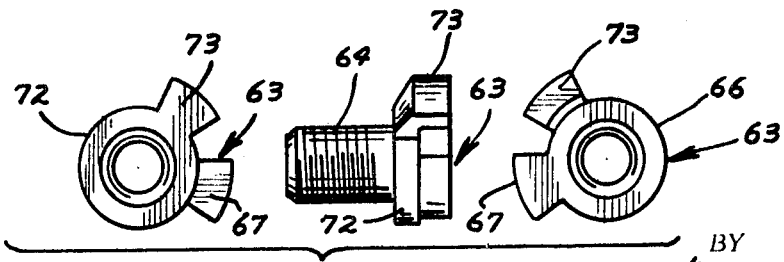

SWIVEL MOUNTING FOR ELECTRICAL APPLIANCE

BACKGROUND OF THE INVENTION

Electrical lamps having flexible connecting arms are used where it is desirable to locate the lampshade in a number of positions to change the direction of lighting. This type of lamp is shown in my U.S. Pat. No. 2,945,946. The connecting arm is attached to a mount which allows free rotational movement of the arm. This mount cannot be used to enclose an electrical cable. The structure connecting the lampshade to the opposite end of the arm limits rotation of the lampshade relative to the arm to less than 360°. In this type of connection there must be a stop or other limiting structure preventing free rotational movement of the lampshade which would wind up, knot and eventually short out the electrical cord passing through the connection.

SUMMARY OF THE INVENTION

The invention broadly relates to an adjustable electrical lamp of the type shown in U.S. Pat. No. 2,945,946. The invention is characterized with swivel mounts for connecting the lamp arm to a support and connecting the lampshade to a part of the lamp arm. The swivel mounts have stationary members with fixed stops which limit rotation of the lamp arm and lampshade to a definite number of revolutions. Cooperating with the stationary members are a plurality of members which move relative to each other to provide for the rotation of the lamp arm and lampshade more than 360°.

The swivel mounts permit the lamp arm to be mounted on a support and still be rotatable at least 360° relative to the support and the lampshade to be mounted at the opposite end of the arm and be similarly rotatable at least 360° relative to the lamp arm in all positions of the arm. The coacting members and stop permit separate rotation of both the arm relative to a fixed support and the lampshade relative to the arm of more than 360°. In addition, the swivel mounts enclose the electrical cord protecting it from liquids, moisture and accidental damage.

IN THE DRAWINGS

FIG. 1 is a plan view of the lamp of the invention mounted on a support;

FIG. 2 is an elevational view of the mount taken along line 2—2 of FIG. 1;

FIG. 3 is an enlarged sectional view taken along the line 3—3 of FIG. 2;

FIG. 4 is an exploded sectional view of the mount;

FIG. 5 is a sectional view taken along the line 5—5 of FIG. 3;

FIGS. 6 and 7 are diagrammatic views showing rotational positions of the leg and stop relative to he fixed arm in the mount;

FIG. 8 is a side elevational view partly in section of the lampshade in assembled relation with the lampshade mount;

FIG. 9 is a sectional view taken along the line 9—9 of FIG. 8;

FIG. 10 is an enlarged sectional view taken along the line 10—10 of FIG. 9;

FIG. 11 is a perspective view of the lampshade mount; and

FIG. 12 is a composite view of the lampshade mount showing end views and side views thereof.

Referring to the drawing there is shown in FIG. 1, the lamp of the invention indicated generally at 15 attached to a support 16 as a table, desk, wall, machine and the like. The lamp 15 has an elongated flexible arm 17 comprising a coiled tubular cable 18 covered with a plastic coating 19. The flexible arm 17 can be bent to a serpentine or coil shape to position the lampshade in different locations. The base end of arm 17 is connected to a swivel mount indicated generally at 21 which allows the arm 17 to be rotated about its axis between 600° and 630° to thereby minimize the twisting of the arm itself along its longitudinal axis. The opposite or outer end of the arm is attached to a lampshade assembly by a connector or swivel mount 23. The power supply cord 24 is completely enclosed in the arm 17 and extends longitudinally through both the swivel mount 21 and the connector 23 thereby protecting the cord 24 from moisture, liquids and accidental damage.

Referring to FIGS. 2, 3 and 4, swivel mount 21 has a stationary tubular member indicated generally at 26 with a longitudinal passage for accommodating the power supply cord 24. Positioned about the upper portion of the member 26 is a cup-shaped rotatable member 27. The base of member 27 has a central hole 28 through which a threaded shank or body 29 of the member 26 projects allowing the cup-shaped member 27 to freely rotate relative to the stationary member 26. Shank 29 is threaded into a tubular bolt 31 projected through a hole 32 in the support 16. A nut 33 threaded onto the bolt 31 clamps the bolt to the support. A washer 34 is interposed between the nut 33 and the bottom side of the support 16 to fixedly mount the stationary tubular member 26 on the support 16. To prevent rotation of the member 26 a second nut 36 threaded on the shank 29 above the bolt 31 is fastened to bolt 31 with an upright screw 37 and a second transverse or radial screw 38 is threaded through nut 36 into the shank 29. Positioned between the nut 36 and the base of the cup-shaped member 27 is a hardened, smooth, flat washer 39 which reduces the friction between the base of rotatable member 27 and the stationary nut 36.

The stationary tubular member 26 has an enlarged cylindrical neck 41 and a circular head 42 slightly smaller than the diameter of the chamber in the cup-shaped member 27. Integral with one side of head 42 and projected downwardly therefrom is an arm or stop 43 spaced outwardly from the side of the neck 41.

Rotatably positioned about the neck 41 is an annular collar 44 having a downwardly projected leg 46 in concentric alignment with the stop 43. Leg 46 projects into an annular recess 47 in the base of the cup member 27. Part of the recess 47 is closed with an upright projection or arm 48 which limits the rotational movement of the collar 44 relative to member 27 to slightly less than 360°. As shown in FIG. 5, the stop 43, leg 46 and arm 48 are in concentric alignment so that the leg 46 engages both the stop and arm functioning as an intermediate member. Located between the collar 44 and the head 42 is a compression wave washer 49. A similar compression wave washer 51 is located between the collar 44 and a shoulder on an annular boss 52 on the base of the cup member 27 surrounding the hole 28. The washers 49 and 51 function as annular friction members or annular constant friction brakes to provide resistive or drag forces to the rotation o the collar and cup-shaped member 27. The amount of drag of these members may be adjusted by tightening the nut 36 to increase the compressive forces on the spring 49 and 51.

When swivel mount 21 is in the assembled position as shown in FIG. 3, neck 41 projects downwardly into the hole 28 in the base of member 27, stabilizing angularly thereby the member 27 and yet permitting the member to rotate about its longitudinal axis. The friction drag of the springs 49 and 51 provide a retarding force against rotation of the member 27 and collar 44. This braking action is aided by the friction between washer 39 and the base of member 27.

The maximum retarding friction drag on member 27 is attained when the lower portion of the neck 41 engages washer 39 along its inner peripheral edge 39A. The diameter of the washer is smaller than the diameter of hole 28 and neck 41.

Referring to FIGS. 6 and 7, there is shown the maximum rotational positions of the arm 48 and leg 46 relative to the fixed stop 43. FIG. 6 shows the initial positions of arm 48 and leg 46 with leg 46 against stop 43 and arm 48 against leg 46. Arm 48 is initially rotated approximately 360° from the forward side of leg 46, position A, to the rear side of leg 46 position B. FIG. 7 shows the final positions of arm 48 and leg 46 against stop 43 and arm 48 against leg 46. Continued movement of arm 48 from position B moves the leg 46 into engagement with the opposite side of stop 43 locating arm 48 in position C which is slightly less than 360°. The total angular movement of the arm 48 depends on the combined width of the stop 43, leg 46 and arm 48. This angular movement is preferably between 600° and 630°. A greater amount of angular movement can be accomplished by reducing he circumferential lengths of one or more of the stop 43, leg 46 and arm 48. In a similar manner, the amount of movement can be reduced by increasing the circumferential lengths of one or more of the stop 43, leg 46 and arm 48.

Located in the upper threaded end of the cup-shaped member 27 is a plug 53 having a central threaded opening 54 for receiving the male threaded portion 56 of the flexible arm 17. In this manner, the arm 17 is connected in a liquid sealed relation with the mount 21 to prevent liquids and moisture from coming into contact with the cord 24 as well as to prevent accidental damage to the cord 24.

Referring to FIGS. 8 to 12, there is shown the lampshade assembly 22 attached to the lamp arm with connector 23 which permits the lampshade to be rotated about the longitudinal axis of the connector 23 approximately 600°. The lampshade assembly 22 has a cone-shaped shade 57 carrying the light socket (not shown) and switch 60. A sidewall of the shade 57 has an enlarged portion 58 providing substantially parallel inner and outer bearing surfaces for the connector 23 on the inside surface of a compression wave washer 71 and the end of sleeve 68 on the outside surface. Extended upwardly from the enlarged portion 58 is an inwardly directed rib 59 operative to limit the rotation of the shade 57 with respect to the connector 23.

As shown in FIG. 10, the enlarged portion 58 has a hole 61 for rotatably accommodating a stationary tubular member 63 having a longitudinal passage for power supply cord 24. Member 63 has an elongated threaded shank or body 64 and an enlarged head 66. As shown in FIG. 11, a stop 67 projects laterally in an outward or radial direction from the head. The shank 64, extended through the hole 61, is threaded into sleeve 68 which is the upper end of the cable 17. A screw 69 locks the sleeve 68 on the shank 64.

Resistance to the rotation of the shade 57 about connector 23 is provided with a compression wave washer 71 located between the end of sleeve 68 and the outside of enlarged shade portion 58.

As shown in FIGS. 10 and 12, located adjacent the inside of the enlarged portion 58 and about the shank or body 64 is an annular collar 72 have radially outward directed leg 73 located in the circumferential path of the rib 59 and the fixed stop 67. Leg 73 also extends axially adjacent the side of the head 66 in circumferential alignment with stop 67. The collar 72 rotatably mounted on the shank 64 adjacent the head 66 is maintained in frictional engagement with the head and the enlarged portion 58 of the lampshade by the compression wave washer 71. The amount of drag or resistance to rotation of the shade may be adjusted by changing the threaded position of the sleeve 68 relative to the shank 64.

Referring to FIG. 9, there is shown the limits of rotation of the lampshade 57 relative to the connector 23. The lampshade 57 is moved in the direction of arrow 74 from position A where rib 59 engages the first side of leg 73 to position B where rib 59 contacts the second or opposite side of leg 73 as shown in FIG. 11. Continued rotation of the lampshade 57 moves both the rib 59 and the leg 73 until the leg 73 contacts the stop 67. Lampshade 57 stops with rib 59 in position C. The total amount of rotation of the lampshade 57 is approximately around 585° to 600°. The amount of rotation of the lampshade can be varied by changing the thickness of the leg 73, the stop 67 or the rib 59.

In summary, each swivel mount has a stationary member with a fixed stop. A plurality of rotatable members are rotatable relative to each other and rotatable relative to the stationary member. Adjacent rotatable members have coacting means which cooperate with each other to limit relative rotation of the rotatable members. The rotatable member closest to the fixed stop coacts with the fixed stop to limit rotation of the last rotatable member to the same number of revolutions as the total number of rotatable members minus one plus rotatable movement less than 360° or one revolution less than the total number of rotatable member plus rotatable movement less than 360°. The amount of rotatable movement beyond the last full revolution is limited by the combined circumferential length of the stop and all coacting means.

The embodiments of the invention in which an exclusive property or privilege is claimed are defined as follows:

1. A swivel mount comprising: a stationary member having a cylindrical body and a fixed stop located radially outwardly from the body, a first annular member positioned about the cylindrical body to rotatably mount the annular member on the stationary member, a leg on the first member selectively engageable with opposite sides of the stop to limit rotation of the first member relative to the stationary member, a second member having a bottom wall rotatably mounted on the cylindrical body of the stationary member, said bottom wall having a projection engageable with only the leg whereby the second member can rotate more than 360° relative to the stationary member and a sidewall surrounding the cylindrical body, fixed stop, first annular member and leg and compression spring washers located on opposite sides of the first member to provide a friction drag for both the first member and second member.

2. The swivel mount of claim 1 wherein the first member is a collar rotatably mounted on the stationary member, said collar having a leg selectively engageable with opposite sides of the fixed stop.

3. The swivel mount of claim 2 wherein the leg extends axially into circumferential alignment with the projection.

4. The swivel mount of claim 2 wherein the leg extends radially outwardly and axially adjacent the stationary member in circular alignment with the stop whereby the leg selectively engages opposite sides of the stop.

5. The swivel mount of claim 5 including a support attached to the cup-shaped member adapted to connect an article to the cup-shaped member.

6. The swivel mount of claim 1 wherein: the compression spring washers are friction means.

7. A swivel mount comprising: a stationary member having a fixed stop, a first member rotatably mounted on the stationary member, a leg on the first member engageable with the stop to limit rotation of the first member relative to the stationary member, a second member rotatably mounted on the stationary member having a projection engageable with only the leg whereby the second member can rotate more than 360° relative to the stationary member, said second member comprising a lampshade having a projection engageable with only the leg of the first member whereby the lampshade can rotate more than 360° relative to the stationary member.

8. The swivel mount of claim 7 wherein the first member is a collar rotatably mounted on the stationary member, said collar having a leg selectively engageable with opposite sides of the fixed stop.

9. The swivel mount of claim 8 wherein the leg extends axially into circumferential alignment with the projection.

10. The swivel mount of claim 8 wherein the leg extends radially outwardly and axially adjacent the stationary member is circular alignment with the stop whereby the leg selectively engages opposite sides of the stop.

11. The swivel mount of claim 7 including: friction means between the lampshade and a portion of the stationary member.

12. The swivel mount of claim 7 wherein the stationary member has a longitudinal passage providing an opening through the swivel mount.

13. A swivel mount comprising: a stationary member having a fixed stop and a cylindrical body, a plurality of rotatable members rotatably positioned on and around the cylindrical body, each rotatable member being rotatable relative to the stationary member, said plurality of rotatable members having coacting means which cooperate with the fixed stop to limit the rotation of each of the rotatable members, the rotatable member most remote from the fixed stop rotatable one revolution less than the total number of rotatable members plus rotatable movement less than 360° and compression spring friction means located on opposite sides of the rotatable members between the most remote member and the stationary member to provide a friction drag for said rotatable members.

PO-1050
(5/69)

UNITED STATES PATENT OFFICE
CERTIFICATE OF CORRECTION

Patent No. 3,604,923          Dated September 14, 1971

Inventor(s) Dillon W. Moffatt

It is certified that error appears in the above-identified patent and that said Letters Patent are hereby corrected as shown below:

Column 1, line 55, "he" should be --the--.

Column 2, line 51, "o" should be --of--.

Column 3, line 6, "he" should be --the--.

Column 4, line 38, "5" should be --1--.

Column 4, line 63, "is" should be --in--.

Signed and sealed this 7th day of March 1972.

(SEAL)
Attest:

EDWARD M. FLETCHER, JR.
Attesting Officer

ROBERT GOTTSCHALK
Commissioner of Patents